United States Patent [19]

Schalk et al.

[11] 4,242,624
[45] Dec. 30, 1980

[54] DIRECT CURRENT STEPPER MOTOR WITH A PERMANENT MAGNET ROTOR AND ELECTRONIC COMMUTATION DEVICE

[75] Inventors: Karl Schalk, Nuremberg; Georg Kögler, Schwabach, both of Fed. Rep. of Germany

[73] Assignee: Siemens Aktiengesellschaft, Berlin and Munich, Fed. Rep. of Germany

[21] Appl. No.: 944,767

[22] Filed: Sep. 22, 1978

[30] Foreign Application Priority Data

Sep. 23, 1977 [DE] Fed. Rep. of Germany ....... 2742932

[51] Int. Cl.³ .............................................. G05B 19/40
[52] U.S. Cl. ..................................... 318/696; 318/368
[58] Field of Search ..................... 318/696, 685, 368

[56] References Cited

U.S. PATENT DOCUMENTS

| | | | |
|---|---|---|---|
| 3,628,110 | 12/1971 | Cassaday | 318/696 X |
| 3,736,487 | 5/1973 | Cook | 318/696 |
| 3,753,106 | 8/1973 | Brosens | 318/696 X |
| 3,849,714 | 11/1974 | Goretzki et al. | 318/696 X |
| 3,953,778 | 4/1976 | Bray | 318/696 X |
| 4,136,308 | 1/1979 | King | 318/696 |

*Primary Examiner*—B. Dobeck
*Attorney, Agent, or Firm*—Kenyon & Kenyon

[57] ABSTRACT

During the positioning of a dc stepper motor equipped with a permanent magnet rotor and electronic commutation device, an additional braking moment is enabled through a time delay stage which is triggered by the commutation signals, and/or the desired value of the nominal current regulator current is reduced to a desired holding current value at the end of the delay of the time delay stage.

9 Claims, 1 Drawing Figure

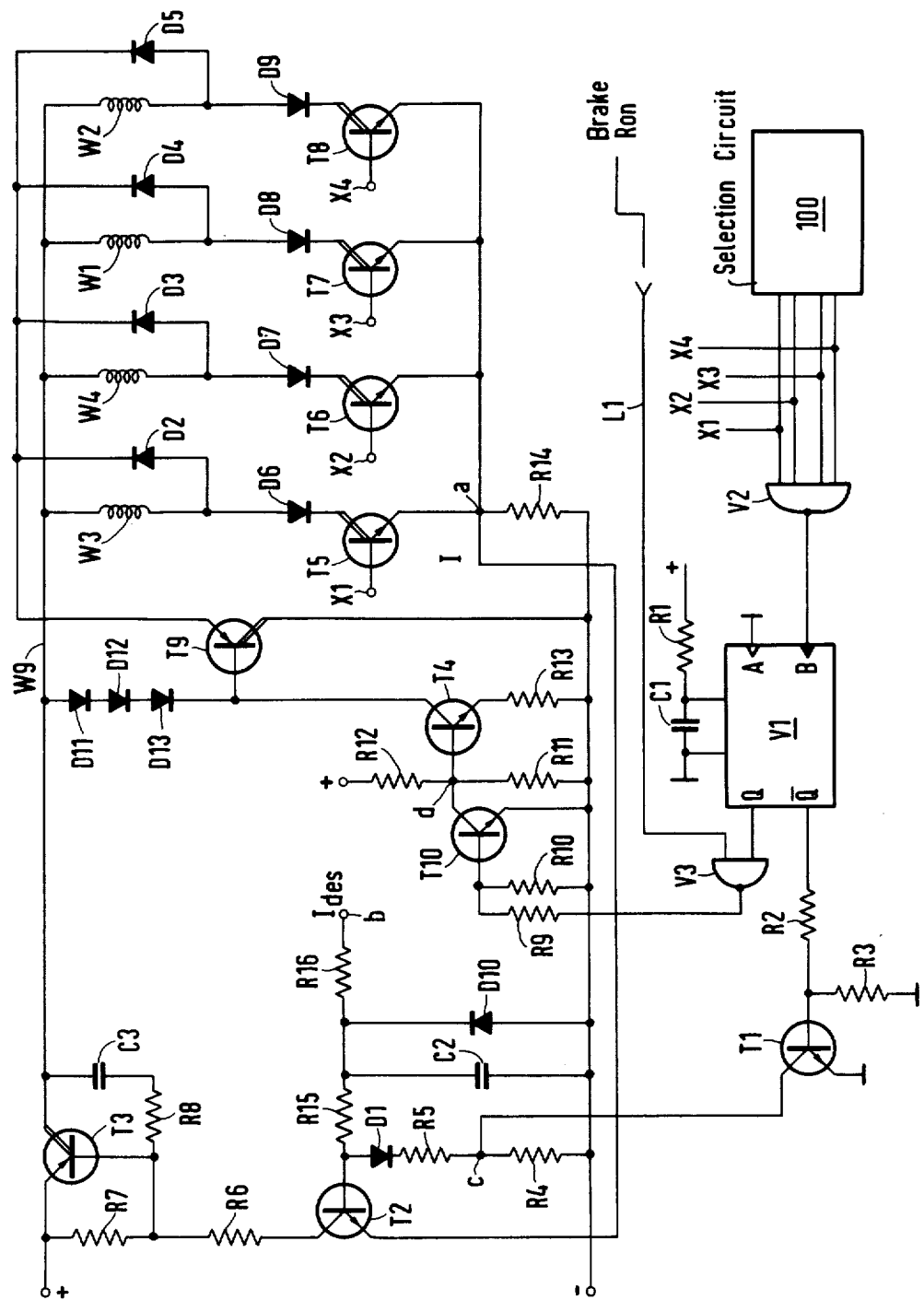

DIRECT CURRENT STEPPER MOTOR WITH A PERMANENT MAGNET ROTOR AND ELECTRONIC COMMUTATION DEVICE

BACKGROUND OF THE INVENTION

This invention relates to D.C. stepper motors equipped with a permanent magnet rotor and electronic commutation device in general and more particularly to an improved motor of this type.

D.C. stepper motors in which the individual winding circuits can be addressed successively via a selector circuit and the current flowing in the winding circuits can be regulated to a constant value by means of a current regulator are known.

If such a motor is to be stopped in a given position, the commutation sequence is interrupted while the last prevailing signal is continued. The permanent magnet rotor then positions itself in alignment with the current-carrying winding axis. In so doing, the rotor comes to rest at the desired position only after protracted oscillations. After the rotor is positioned, a considerable power loss in the motor is converted into heat, although the motor current is kept constant by the current regulator.

SUMMARY OF THE INVENTION

It is an object of the present invention to improve, in a D.C. motor of the kind described at the outset, not only the oscillation behavior of the permanent magnet rotor in the given stop position, but also to increase the efficiency of the motor. According to the present invention, this problem is solved by enabling an additional braking moment during every positioning process through a time delay stage, and by reducing the desired current regulator value from a desired nominal current value to a desired holding current value after the time delay of the time delay stage. Preferably a retriggerable time delay stage is used, triggered by the commutation signals of the selector circuit. In one preferred embodiment, a time delay stage output signal is linked to an input signal for "running" and "braking" in such a manner that the voltage induced in the winding circuits by the permanent magnet rotor is coupled out and shorted during the delay of the time delay stage, for the achievement of the additional braking moment.

BRIEF DESCRIPTION OF THE DRAWING

The single FIGURE is a circuit diagram of an embodiment of the present invention.

DETAILED DESCRIPTION OF THE INVENTION

The winding legs (circuits) W1 to W4 of a motor according to the present invention are joined in a neutral point and connected to the positive pole of a D.C. voltage source via the collector-emitter path of a power transistor T3. The other ends of the winding circuits W1 to W4 are connected via diodes D6 to D9 and the collector-emitter path of power transistors T5 to T8. The emitters of power transistors T5 to T8 are combined at junction point a and connected to the other pole of the D.C. voltage source via a current measuring resistor R14. The bases X1 to X4 of the power transistors T5 to T8 are connected to a selector circuit 100, through which the power transistors T5 to T8 are addressable in cyclic order.

The transistor T3, serving as the regulating output stage, has its base connected to its collector via a resistor R8 and capacitor C3 on the one hand and to the positive pole of the D.C. voltage source via a resistor R7 on the other. Connected in series with the resistor R7 is a resistor R6 which in turn is connected to the junction point a via the collector-emitter path of a control transistor T2. Via resistors R15 and R16, the base of transistor T2 is connected to an input b, through which a quantity proportional to the desired current value I can be fed in. The base of transistor T2 is connected to the negative pole of the D.C. voltage source via a diode D1 and resistors R4 and R5. Parallel to this combination are a smoothing capacitor C2 and a diode D10 in parallel. The two resistors R4, R5 and the voltage applied to input b are selected so that the current at the base of transistor T2 is proportional to the nominal motor current. The two resistors R4 and R5 thus form the desired motor current resistance. The junction point c of the two resistors R4 and R5 is connected to the negative pole of the D.C. voltage source via the collector-emitter path of another transistor T1. When the transistor T1 is conducting, the resistor R4 is practically shorted so that the resistor R5 now becomes effective as the desired current regulator resistance. The desired current value is reduced by the reduction of the desired resistance value so that a motor holding current appears, as will yet be explained in greater detail. The ratio of nominal motor current to motor holding current can be set by the resistance ratio R4 to R5. The base of transistor T1 is connected to ground via a resistor R3 on the one hand and to the output $\bar{Q}$ of a time delay stage V1, e.g., a retriggerable one-shot multibrator, via a resistor R2 on the other. If the output $\bar{Q}$ is at logic "0," the base of transistor T1 is grounded, and the transistor T1 is therefore cut off. If, on the other hand, the output $\bar{Q}$ of the time delay stage V1 is at logic "1," the potential at the base of transistor T1 is increased in accordance with the resistance ratio R2 to R3; this makes the transistor T1 go into conduction and shorts resistor R4 so that the desired holding current value for the current regulator T2 becomes effective. The time delay of the time delay stage V1 is determined by a resistor R1 and a capacitor C1. While the input A of the time delay stage V1 is grounded, the commutation signals of the selector circuit 100 are fed to the clock input B of the time delay stage V1 via a NOR gate V2. Every commutation signal thus triggers the time delay stage V1. During the motor's rotary motion, the retriggerable time delay stage V1 is triggered continuously by the commutation signals of the selector circuit 100 so that the input to transistor T1 is at logic "0". This makes both resistors R4 and R5 effective, which means that the desired nominal current value for the current regulator is given. When positioning, i.e., when the motor is to be stopped at a desired position, the last commutation signal of the selector circuit 10 continues so that the rotor can position itself in alignment with current-carrying winding axis. During this process, the motor current is kept constant by the current regulator T2. After the positioning is completed, this motor current causes a considerable power loss which is converted into heat in the motor. At the end of the delay time given by resistor R1 and capacitor C1, the time delay stage returns to its initial position in which the output $\bar{Q}$ is a logic "1". This causes the transistor to go into conduction and thus causes the resistor R4 to be shorted. Therefore, a correspondingly lower current flows through the motor.

This makes it possible to reduce the power loss in the motor substantially.

The rotor attains the given stop position only after protracted oscillation. Time-dependent electrical damping is proposed to improve the oscillating behavior. The Q output of time delay stage V1 is connected to one input of a NAND gate V3. The other input of the NAND gate V3 is connected to a command line L1, through which a "start" command can be given. If the line L1 is at logic "0," this means "run" or "operation" of the motor, and if line L1 is at logic "1", it means "brake". The output of the NAND gate V3 is connected to the base of a transistor T10 via a resistor R9. The base of this transistor is also connected via a resistor R10 to the negative pole of the D.C. voltage source so that the transistor T10 is not conducting when a "0" is present at the output of the NAND gate V3. But if the output of the NAND gate V3 is "1", the transistor T10 goes into conduction, thereby shorting one resistor R11 of a voltage divider R11 and R12. Due to the fact that the junction point d of this voltage divider is connected to the base of another transistor T4, the latter is non-conducting when the transistor T10 is conducting. The emitter of transistor T4 is connected to the negative pole of the D.C. voltage source via a resistor R13. The collector of transistor T4 is connected to the positive pole of the D.C. voltage source via three diodes D11, D12, D13 on the one hand and to the base of a power transistor T9 on the other. The purpose of the power transistor T9 is to short circuit the positive voltage half wave of the voltage induced by the permanent magnet rotor in the winding circuits, which is not carrying current at the time, taken off via the diodes D2 to D5.

When the stepper motor is in operation, a "0" is given to the NAND gate V3 via the command input L1. Due to the fact that the time delay stage V1 is triggered constantly by the commutation signals of the selector circuit 100 during the rotary motion of the motor, the output Q carries "1" so that the output of the NAND gate V3 is a "1". This causes the transistor T10 to conduct and the transistor T4 to be cut off as has been explained earlier. Consequently, the transistor T9 is cut off also. The output $\bar{Q}$ of the time delay state V1 is "0" which causes the transistor T1 to be non-conducting so that the desired nominal current value for the current regulator is effective.

For positioning, the commutation sequence of the selector circuit 100 is interrupted, the last signal remaining active. At the same time, a "1" is supplied, via the command input L1, which means "braking". Since the output Q of the time delay stage V1 is "1", both inputs of the NAND gate V3 are "1" and "0" will appear at the latter's output. Due to the "0" at the output of the NAND gate V3, the base voltage of transistor T4 is increased due to the voltage divider resistor R11 becoming effective, which also causes the transistor T9 to go into conduction, its base voltage being below the potential of the neutral point W9 of the windings by the threshold voltage of the three diodes D11 to D13. What this base bias of the power transistor T9 achieves is that the positive EMF half wave induced in the winding circuits W1 to W4 is short circuited; in this process, the threshold voltages of the coupling diodes D2 to D5 and the base emitter voltages of the power transistor T9 are compensated by the diodes D11 to D13.

Shorting the voltages induced in the winding circuits W1 to W4 results in an additional braking moment so that the oscillating behavior of the motor is improved.

The negative EMF may be taken off and shorted in the same manner; also, both voltage directions may be shorted or loaded to form an additional braking moment.

In the circuit diagram shown, the shorting current is limited by the winding resistance. If the short circuit currents are too high, an additional resistor may be inserted in the collector lead of power transistor T9 for current limitation, or addressing of the power transistor T9 may be controlled as a function of this transistor's collector current.

After the permanent magnet rotor has positioned itself, the commutation signals are shut off, and the time delay stage V1 returns to the normal position (Q=0, $\bar{Q}$=1) after the set delay time. This causes a "1" to appear at the output of the NAND gate V3, the transistor T10 to go into conduction, the base of transistor T4 to be grounded so that the transistor T4 and the power transistor T9 are cut off. At the same time, the transistor T1 is activated and thus the resistor R4 is bridged so that a smaller desired current value (holding current) is set for the current regulator T2.

What is claimed is:

1. In a direct current stepper motor with a permanent magnet rotor and electronic commutating device, in which the individual winding circuits are addressed successively via a selector circuit and the current flowing in the winding circuits is regulated to a constant value by means of a current regulator, the improvement comprising:
   (a) means to enable an additional braking moment during each positioning including means to take off the negative and/or positive EMF voltage and short said voltage comprising:
      i. a coupling diode associated with each winding circuit, all coupling diodes being interconnected to a terminal; and
      ii. a power transistor having a control input, said power transistor coupling said terminal to the power supply through its emitter collector path; and
   (b) a time delay stage having its output coupled to said control input of said transistor.

2. The improvement according to claim 1 and further including means to reduce the desired current value for the current regulator from a desired nominal current value to a desired holding current value after the time delay of said time delay stage.

3. The improvement according to claim 2 wherein said time delay stage comprises a retriggerable time delay stage triggered by the commutation signals of the selector circuit.

4. The improvement according to claim 1, and further including a plurality of diodes connected in series, biasing the base potential of said power transistor lower than the potential of the neutral point of the winding circuits.

5. The improvement according to claim 4, wherein sufficient of said diodes are connected in series that the threshold voltages of the coupling diodes and the base-emitter voltage of the power transistor are compensated.

6. The improvement according to claim 1 and further including a resistor limiting the current driven by the voltage induced in the winding circuits.

7. The improvement according to claim 6, wherein said resistor for current limitation is inserted in the collector lead of said power transistor.

8. The improvement according to claim 6, wherein the drive of said power transistor is controlled as a function of the latter's collector current.

9. The improvement according to claim 2 wherein said means to reduce comprise a transistor to short circuit a part of a desired current value resistor in response to an output signal of the time delay stage.

* * * * *